March 7, 1950 R. R. SCHOON 2,500,010
ELECTRIC WINDSHIELD DEFROSTER AND WIPERS COMBINED
Filed July 29, 1948
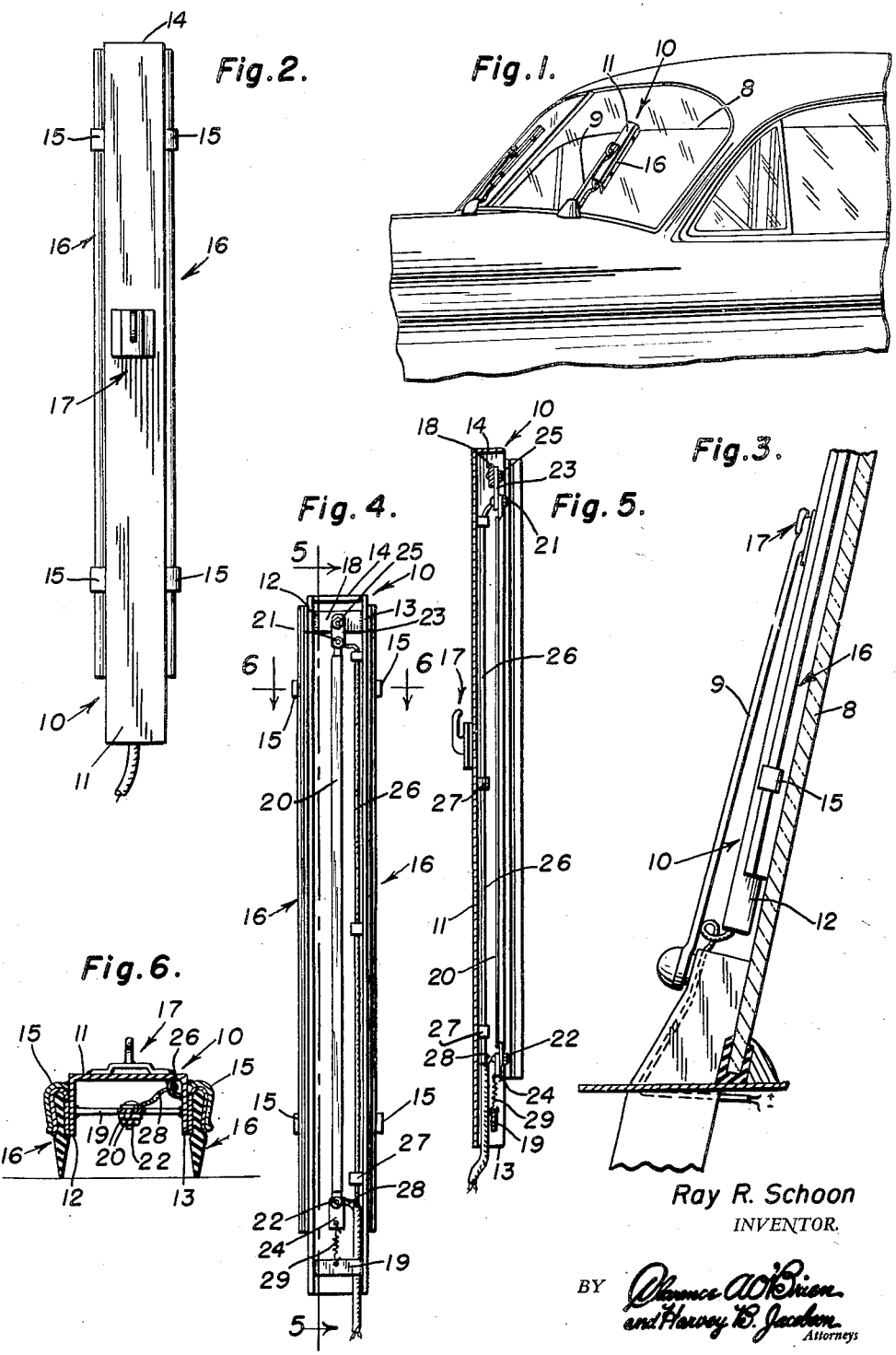
Ray R. Schoon
INVENTOR.

Patented Mar. 7, 1950

2,500,010

UNITED STATES PATENT OFFICE 2,500,010

ELECTRIC WINDSHIELD DEFROSTER AND WIPERS COMBINED

Ray R. Schoon, La Porte City, Iowa

Application July 29, 1948, Serial No. 41,370

2 Claims. (Cl. 219—19)

The present invention relates to certain new and useful improvements in electrically heated-type windshield wipers such as have been adopted and used to melt ice and snow and to effectively dislodge and remove same from the surface of a windshield.

As the introductory statement of the invention implies, I am aware that windshield wipers having spaced parallel wipers and intervening heater means are in common use. Various styles and forms, having the stated characteristics, have been patented by others. Therefore, in an effort to better and more satisfactorily meet the requirements of the trade and the users, I have evolved and produced a windshield defroster with combined wipers which, I believe, more satisfactorily serve the requirements of manufactures and users.

In carrying out my inventive aims, and with a view toward more successfully meeting what I believe to be the prerequisite of efficient accessories in the class of the invention under advisement, I provide briefly, an elongated rectangular casing which substantially encloses electrically charged heating means, said casing serving to concentrate and apply the heat where wanted and also functioning as a satisfactory carrier for conventional-type windshield wipers.

A further and more specific objective comprehends the adoption and use of a rectangular casing which is open at the bottom and open on the side facing the windshield, carries the parallel wiper blades and effectively houses an electrical heating element which takes the form of a flat current conductor strip, the same having simple fixtures at the opposite ends which permit ready assembling of the unit in the casing, the unit being protected against the weather and provided with spring means which compensates for customary expansion and contraction.

Other objects, features and advantages will become more readily apparent from the following description and the accompanying illustrative drawings.

In the drawings:

Figure 1 is a fragmentary perspective view showing a portion of an automobile with windshield wipers, of the defroster type, constructed in accordance with the principles of the present invention;

Figure 2 is an elevational view of the improved defroster-wiper per se;

Figure 3 is an enlarged fragmentary sectional view showing the automobile windshield, the wiper arm and my invention mounted on the wiper arm;

Figure 4 is an elevational view based on Figure 2 observing the opposite or open side of the casing;

Figure 5 is a longitudinal section on the line 5—5 of Figure 4, looking in the direction of the arrows;

Figure 6 is a cross section, on an enlarged scale, on the line 6—6 of Figure 4, looking in the direction of the arrows.

Referring to the drawings, the automobile windshield, which is conventional, is denoted by the numeral 8 whereas the numeral 9 designates a conventional-type windshield wiper arm to which my improved combined defroster and wiper device is detachably connectable in the manner shown in Figures 1 and 2.

As previously stated, my invention is characterized by a sheet metal or equivalent casing 10 of general rectangular form, the same including a flat web or body portion 11, spaced parallel side walls 12 and 13, and end wall 14. Clips are provided, said clips being denoted by the numerals 15 and being such as to detachably accommodate conventional-type blades or so-called windshield wipers 16. Incidentally, the main or web wall 11 is provided with an appropriate fixture or bracket 17 to accommodate the windshield wiper arm 9, as shown in Figure 3. No claim is asserted to the bracket 17 or the windshield wipers 16 carried by casing 10. The novelty is predicated, it is believed, on the elongated casing, open at the bottom and open on one side and constructed to accommodate a special electrical heater unit. In accomplishing this I provide cross-straps 18 and 19 on the interior of the casing at upper and lower end portions of the casing, as shown better in Figure 4. The electrical heater unit, which is supported on said cross-straps, comprises a flat strip of electricity conducting material 20 which provides the desired resistance, said strip having its end portions bolted as at 21 and 22 to substantially duplicate insulated blocks or adapters 23 and 24. The upper adapter or block 23 is separably bolted, at 25, to the upper cross-strap 18 and the fastening means 21 provides a binding post to accommodate the electric wire 26 which is mounted in the casing by suitable retainers 27. The fastening means 22 at the bottom serves to accommodate the remaining wire 28 as shown in Figure 4. The numeral 29 designates a coiled spring carried by the lower insulator block 24 which spring is attached to the cross-strap 19 and which serves to facilitate application and removal of the heater unit and also compensates for expansion and contraction. Thus, the novelty has to do with cross-straps 18 and 19 across the end portions of the casing, insulator blocks attached to the ends of a flat resistance element and separably fastened to the cross-straps, one fastening being bolt means and the other fastening being compensating spring means. As stated, I am aware that casings with wipers and with heaters are not new in the art but believe that my particular construction and arrangement is novel, efficient and destined for practical adoption and use.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A windshield wiper appliance of the class shown and described comprising an elongated rectangular casing, said casing being closed at its upper end, open at its lower end, and open along that side which, in use, parallels the windshield, the longitudinal side walls of said casing having spring clips, windshield wipers mounted in said clips, said wipers being in spaced parallelism with each other, cross straps mounted respectively in the opposite end portions of said casing, a metal heater element constituting an electrical resistance-type heater, insulator blocks, means separably fastening respective end portions of said heater element to said blocks including binding posts for attachment of current supply wires, means for bolting one of said blocks to one of said cross straps, and spring means carried by the remaining block and detachably connectible with the remaining cross strap.

2. A windshield wiper appliance of the class shown and described comprising an elongated rectangular casing embodying spaced parallel side walls connected together at corresponding ends by a transverse end wall, said casing being thus open at one end and open along one side, the side which, when in use, parallels the windshield, pairs of spring clips secured exteriorly to said side walls, a windshield wiper for each side wall mounted in the clips on the corresponding side wall, said windshield wipers being thus disposed in spaced parallelism, bracket means carried by said casing and adapted to be mounted on and operated by a windshield wiper arm, cross straps mounted respectively in the opposite end portions of said casing, a flat metal resistance element constituting a heater, insulated means connecting one end of said strip with an adjacent cross strap, and spring-equipped insulated means connecting the opposite end of said element with the remaining cross strap.

RAY R. SCHOON.

REFERENCES CITED

The following references are of record in the file of this patent:

UNITED STATES PATENTS

| Number | Name | Date |
|---|---|---|
| 1,685,389 | Adams | Sept. 25, 1928 |
| 1,739,411 | Murphy | Dec. 10, 1929 |
| 2,187,000 | Thorp | Jan. 16, 1940 |